United States Patent [19]

Sakai et al.

[11] 4,428,652
[45] Jan. 31, 1984

[54] FOCUS DETECTING SYSTEM

[75] Inventors: Shinji Sakai; Nobuhiko Shinoda; Takao Kinoshita; Kazuya Hosoe; Takashi Kawabata, all of Kawasaki, Japan

[73] Assignee: Canon Kabushiki Kaisha, Tokyo, Japan

[21] Appl. No.: 313,578

[22] Filed: Oct. 21, 1981

[30] Foreign Application Priority Data

Oct. 23, 1980 [JP] Japan .................................. 55-149078

[51] Int. Cl.³ .............................................. G03B 7/08
[52] U.S. Cl. .................................................. 354/407
[58] Field of Search ........................ 354/25, 31 F, 59

[56] References Cited

U.S. PATENT DOCUMENTS

| | | | |
|---|---|---|---|
| 2,831,057 | 4/1958 | Orthuber | 354/25 |
| 3,896,304 | 7/1975 | Aoki et al. | 354/25 |
| 4,368,978 | 1/1983 | Tsunekawa et al. | 354/25 |

FOREIGN PATENT DOCUMENTS 55-76311  6/1980  Japan ...................................... 354/31

Primary Examiner—Russell E. Adams
Attorney, Agent, or Firm—Fitzpatrick, Cella, Harper & Scinto

[57] ABSTRACT

A focus detecting system detects an image formation state of an image of an object by processing a time-serial output from a photoelectric transducer element through a high-pass filter. In order to suppress the outputs from the high-pass filter corresponding to the time-serial signal at the initial moment of light reception by the photoelectric transducer element or immediately thereafter, an amplifier is provided which performs the initial setting of the high-pass filter. The input and output ends of the amplifier are connected to parts of the high-pass filter, and the output impedance of the amplifier may be changed in response to a signal from an external source.

7 Claims, 19 Drawing Figures

FOCUS DETECTING SYSTEM

BACKGROUND OF THE INVENTION

1. Field of the Invention

The present invention relates to a focus detecting system and, more particularly, to a focus detecting system which detects a focusing state of an optical system which is set to cause change in the image formation state of an image of an object in accordance with data processing thereof, the image being formed on a time-serial signal output type photoelectric transducer element such as an image pickup tube or a solid image-pickup element such as a CCD, BBD or CID.

2. Description of the Prior Art

Various conventional focus detecting systems for optical systems have been proposed. An increasing number of focus detecting systems have been proposed which utilize solid image-pickup elements such as the CCD, BBD or CID, the practicability of which has recently become notable. The characteristic feature of the image pickup tubes and solid image-pickup elements as described above resides in that extremely small photoelectric transducer elements are incorporated which produce time-serial electric signals of small picture elements of an image formed on an image formation plane. Therefore, the image pickup tube and the solid image-pickup element allow subsequent time-serial processing of the signals and are therefore suitable for processing with electric circuitry, in contrast to conventional systems which have a plurality of usual photoelectric elements on which the image of an object is formed to produce photoelectric conversion signals of the image. Since the photoelectric transducer elements constituting the solid image-pickup means, unlike the usual photoelectric transducer elements, serve to accumulate over a given period of time charge obtained by photoelectrically converting the energy of light incident thereon and to output time-serial signals, the area for each of these elements may be made very small so that the obtained time-serial signal train provides image signals of good resolution.

An example of a focus detecting system is disclosed in U.S. Pat. Nos. 3,364,815, 3,621,136 and 3,896,304 (German DAS No. 23 49 311) wherein a time-serial output type photoelectric transducer element of the type described above is used as an image sensing means, and the image formation state of an image of an object formed by an optical system is detected through the time-serial output signal from the image sensing means to thereby detect the focusing state of the optical system on the object. The focus detecting systems disclosed in these U.S. Patents have a common feature in that the time-serial output signal from the time-serial output type image sensing means (an image pickup tube or a solid image-pickup element) is supplied to a differentiating circuit, that is, a kind of high-pass filter to obtain a differential signal representing the change in the image signal, and the detection of the image formation state of the image is performed according to this differential signal.

However, when a high-pass filter is used to obtain a change in the image signal, the image signal abruptly rises at the initial moment of light reception by the photoelectric transducer element or immediately thereafter. Therefore, the change in the image signal is detected as magnified by the high-pass filter, making it difficult to detect the actual change in the image signal. For example, the high-pass filter produces abruptly high outputs and subsequent oscillating outputs for a considerable length of time. This significantly degrades the focus detecting precision.

SUMMARY OF THE INVENTION

The present invention has been made in consideration of this and has for its object to provide an improvement in a focus detecting system wherein a time-serial output type photoelectric transducer element is used as an image sensing means and the time-serial image signal from the photoelectric transducer element is supplied to a high-pass filter to detect an image formation state of an image according to the time-serial image signal, which eliminates the drawbacks of the prior art focus detecting systems as described above and which is capable of guaranteeing focus detection with high precision. The typical drawback as described above is the abrupt rise of the image signal at the initial moment of light reception by the photoelectric transducer element or immediately thereafter, resulting in incorrect detection of the change in the image signal. For example, the high-pass filter produces abruptly changing outputs or subsequent oscillating outputs for a considerable length of time.

In order to achieve the above and other objects, there is provided according to the present invention, a focus detecting system including an amplifier circuit whose input and output ends are both connected to part of a high-pass filter and which is capable of varying the impedance of its output in response to a signal from an external source, so that the high-pass filter can be set to the initial state at the initial moment of light reception by the photoelectric transducer element, thereby suppressing the output from the high-pass filter corresponding to the time-serial signal input thereto which in turn corresponds to that initial moment or immediately thereafter.

Other objects and features of the present invention will become apparent from the following description when taken in conjunction with the accompanying drawings.

BRIEF DESCRIPTION OF THE DRAWINGS

The preferred embodiments of the present invention will now be described with reference to the accompanying drawings, in which:

FIGS. 1A to 1C are model views for explaining the principle of focus detection operation of an example of a focus detecting system to which the present invention may be applied, wherein FIG. 1A shows the optical arrangement of the focus detecting system, FIG. 1B shows the configuration of light-receiving sections of a photoelectric transducer element shown in FIG. 1A, and FIG. 1C shows changes in sharpness of the image at three points in FIG. 1A;

DETAILED DESCRIPTION OF THE PREFERRED EMBODIMENTS

Figure 1A:
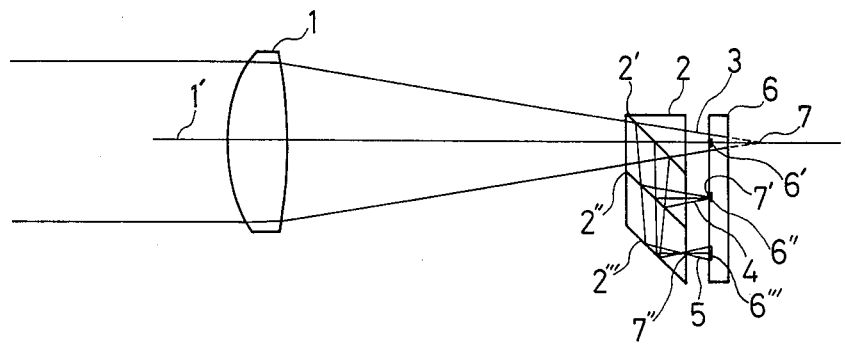

Referring to FIG. 1A, an imaging lens 1 has an optical axis 1'. A beam splitter 2 is arranged in the optical path of the imaging lens 1 and has semi-transmittal sections 2' and 2" and a total reflection section 2'''. Light emerging from the imaging lens 1 becomes incident on the semi-transmittal section 2', and is then divided by the semi-transmittal section 2" and the total reflection section 2''' into three separate light rays 3, 4 and 5. If the semi-transmittal section 2' transmits about one third of the incident light and reflects the remaining two thirds, and the semi-transmittal section 2" transmits about half of the incident light and reflects the remaining half of the incident light, it is apparent that the energy for the three divided light rays 3, 4 and 5 becomes substantially the same. A photoelectric transducer 6 has three light-receiving sections 6', 6" and 6'''.

If the convergent point of the light ray 3 is at point 7, it is easily seen that the convergent points of the divided light rays 4 and 5 are at points 7' and 7", respectively. If the convergent point 7' of the light ray 4 which is reflected and divided by the semi-transmittal sections 2' and 2" coincides with the light-receiving section 6", the convergent point 7 of the light ray 3 incident on the light-receiving section 6' is located behind the light-receiving section 6', and the convergent point 7" of the light ray 5 incident on the light-receiving section 6" is located in front of the light-receiving section 6'''. The deviations of these converging points from the light-receiving sections become the same if the distances between the semi-transmittal sections 2' and 2" and between 2" and the total reflection section 2''' are equal to each other. As a result, the sharpness of the image on the light-receiving section 6" becomes maximum, and the sharpness of the images on the light-receiving sections 6' and 6''' become low but are similar to each other.

Figure 1B:
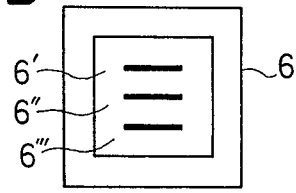
Figure 1C:
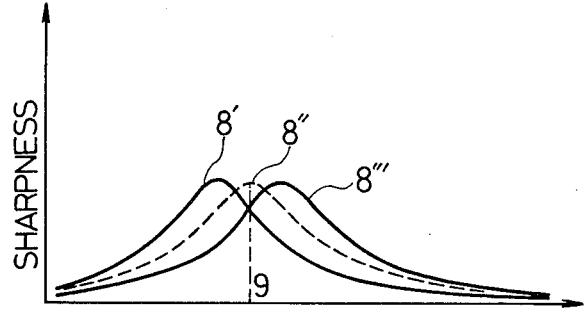

If the imaging lens 1 is displaced along the optical axis 1', the sharpness of the images on the light-receiving sections 6', 6" and 6''' change as shown in FIG. 1C. Curves 8', 8" and 8''' representing changes in the sharpnesses of the images on the light-receiving sections 6', 6" and 6''' form peaks in FIG. 1C, wherein the displacement of the imaging lens 1 is plotted as the abscissa and the sharpness is plotted as the ordinate. The condition shown in FIG. 1A corresponds to point 9 shown in FIG. 1C. If the light-receiving surface of the light-receiving section 6" of the photoelectric transducer 6 is arranged to substantially coincide with the predetermined focal plane (the film surface in the case of a camera) of the imaging lens 1, it is detected that the imaging lens 1 is in the in-focus state under the condition shown in FIG. 1A, that is, when the relationships between the sharpnesses of the images on the respective light-receiving sections 6', 6" and 6''' are represented by the point 9 in FIG. 1C. Then, it is apparent from FIG. 1C that the relationships between the sharpnesses 8' and 8''' are inverted according to whether the imaging plane surface of the lens 1 is in front of or behind the light-receiving section 6". In this manner, the near-focus state and the far-focus state can be detected.

FIG. 1b is a front view of the photoelectric transducer 6 wherein the respective light-receiving sections 6', 6" and 6''' comprise, for example, belt-shaped linear CCDs. However, the shape of the light-receiving sections is not necessarily limited to this shape.

Figure 2:
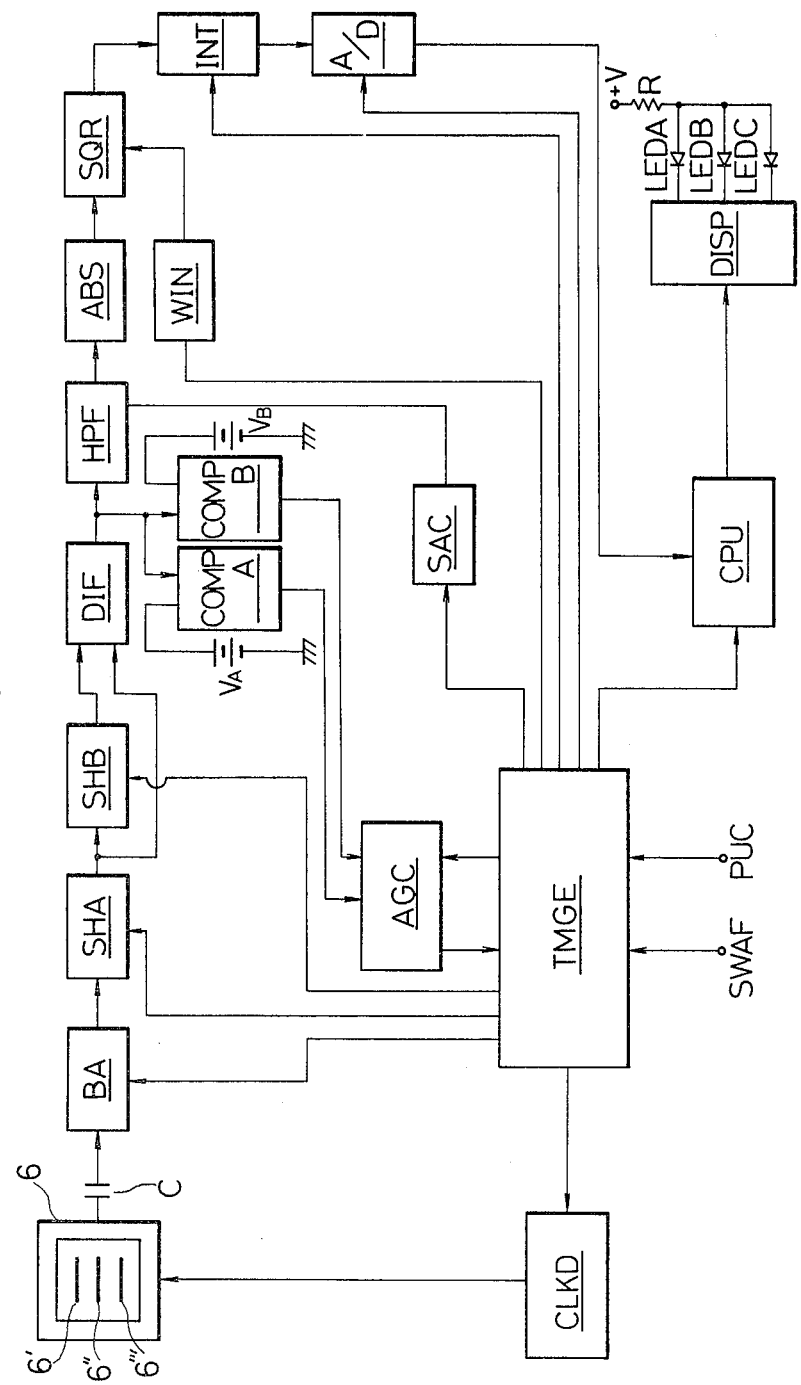
FIG. 2 is a block diagram showing the configuration of electric circuitry of an embodiment in which the improvement of the present invention is applied to a focus detecting system according to the principle shown in FIGS. 1A to 1C.

A focus detecting system is thus obtained which has the beam splitter 2 and the photoelectric transducer 6 with the three light-receiving sections 6', 6" and 6'''. FIG. 2 shows a block diagram of an electric circuit which reads image signals from the light-receiving sections 6', 6" and 6''', extracts sharpness signals, and discriminates the magnitudes of sharpness of the image at three points. Many of the blocks shown in FIG. 2 are of known configuration and details of them are shown in a series of applications as in U.S. patent application Ser. No. 59,635, "Focus Detecting System", Kinoshita et al., filed on July 23, 1979 (corresponding German DOLS 29 30 636), U.S. patent application Ser. No. 151,703, "Image Sharpness Detecting System", Kawabata et al, filed on May 20, 1980 (corresponding German Patent Application P 30 19 908.7), and so on. Therefore, only parts which are essentially related to the present invention will be described.

Referring to FIG. 2, the photoelectric transducer 6 shown in FIG. 1 comprises a CCD having the three light-receiving sections 6', 6" and 6'''. A series of clock signals for operating the CCD 6 are supplied from a clock driver CLKD. These clock signals are supplied to initiate a series of operations of the CCD 6 such as integration, transfer, resetting and so on in a predetermined order. The charge stored for a predetermined period of time in the CCD 6 is charge-voltage converted at the output of the CCD 6 and is thereafter input, as an image signal, to a balance adjusting circuit BA through a capacitor C for suppressing noise. These image signals corresponding to the three light-receiving sections 6', 6" and 6''' of the CCD 6 are time-serially read out in an order which is determined by the configuration of the CCD 6.

Figure 3:
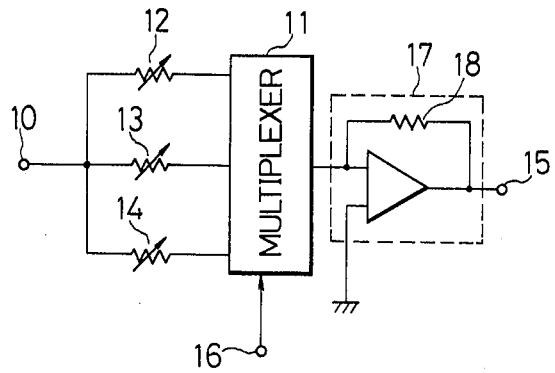
FIG. 3 is a partial circuit diagram showing an example of a balance adjusting circuit shown in the circuitry of FIG. 2.

The balance adjusting circuit BA, as shown in FIG. 3, has a multiplexer 11 of known configuration and three variable resistors 12, 13 and 14. Referring to FIG. 3, the image signal as described above is supplied to the multiplexer 11 through the variable resistors 12, 13 and 14. In response to a synchronizing signal received from a terminal 16, the multiplexer 11 receives the image signals corresponding to the respective light-receiving sections 6', 6" and 6''' through the variable resistors 12, 13 and 14, respectively, and outputs them to an amplifier 17. The variable resistors 12, 13 and 14 control the balance of the image signals from the light-receiving sections 6', 6" and 6'''. The outputs from the resistors 12, 13 and 14 are input through the multiplexer 11 to the amplifier 17 where the gains of the respective images are controlled according to their ratios by a feeding resistor 18 and then are input to the next electric circuit. Balance adjustment of the image signals is useful when there is an imbalance in the three light rays 3, 4 and 5 divided by the beam splitter 2. The synchronizing signal is supplied at the terminal 16 from a timing generator TMGE. Although three variable resistors are used in this embodiment, two variable resistors may be used to balance two image signals in relation to the remaining image signal.

Signal processing in this circuitry must be performed according to a series of synchronizing signals which are supplied from the timing generator TMGE. In response to an operation command signal SWAF of the circuitry (a signal generated in synchronism with the depression of a shutter release button to the first position in the case of a camera) and a power clear signal PUC, the timing generator TMGE generates the various synchronizing signals to the respective blocks in the circuitry in a predetermined order. The timing generator TMGE may be of known configuration and need only generate the group of synchronizing signals suitable for the operation of the circuitry of this embodiment. The clock driver CLKD also operates in response to the timing generator TMGE.

The image signals adjusted by the balance adjusting circuit BA are input to a first sampling and holding circuit SHA. The first sampling and holding circuit SHA shapes the image signals from the CCD 6. In response to a sampling pulse from the timing generator TMGE synchronous with the output of the image signals from the CCD 6, the first sampling and holding circuit SHA samples and holds the level of the respective image signals.

The temperature and accumulating time of the CCD are influenced by the dark current since the actual CCD comprises a semiconductor. Therefore, the actual image signal includes the dark current level superposed on the signal corresponding to the actual amount of incident light. Thus, the image signal contains a noise component. Part of the light-receiving section of the CCD is masked with an aluminum mask or the like, and a signal output from this part is considered to be the dark current level. Then, the difference is obtained between the output from the unmasked light-receiving section and the output of the masked part (to be referred to as a dark current bit hereinafter), that is, the dark current level, to thereby remove the influence of the dark current. The dark current bit (not shown) is included at the end of each of the light-receiving sections 6', 6" and 6''' of the CCD 6, so that this bit is output first. A second sampling and holding circuit SHB samples and holds the output level of these dark current bits. The second sampling and holding circuit SHB receives commands from the timing generator TMGE for holding the output level. A differential amplifier DIF receives the output signal from the sampling and holding circuit SHA and the output signal from the sampling and holding circuit SHB for taking the difference between these two inputs. The image signals obtained as the output of the differential amplifier DIF are signals whose dark current level is cancelled and which correctly correspond to the amount of incident light.

The output of the differential amplifier DIF is input to a high-pass filter HPF and to two comparators COMPA and COMPB. A reference voltage VA is supplied to the comparator COMPA and a reference voltage HB is supplied to the comparator COMPB. These comparators COMPA and COMPB constitute a window comparator.

Figure 4A:
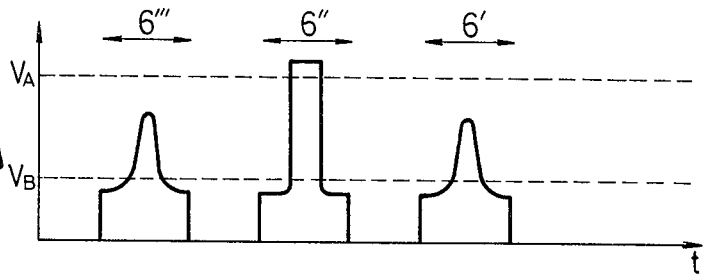
FIGS. 4A to 4C show signal waveforms for explaining the function of a window comparator shown in FIG. 2, which discriminates if the accumulating time is appropriate.
Figure 4B:
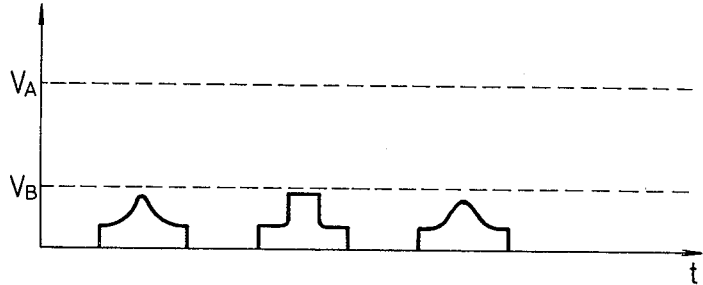
Figure 4C:
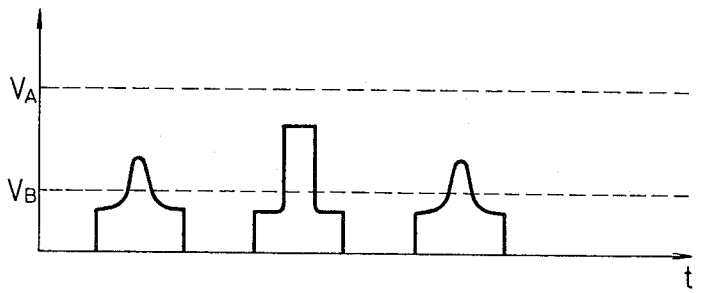

The mode of operation of the window comparator will now be described with reference to FIGS. 4A–4C. FIGS. 4A, 4B and 4C show the relationship between the peak value of the image signal compensated for the dark current level (to be referred to as the dark current-compensated image signal hereinafter) and the reference voltages VA and VB, the time being plotted as the abscissa and the voltage being plotted as the ordinate. The range in FIG. 4A indicated by arrows at 6''', 6" and 6' represent the timings with which the image signals are output from the light-receiving sections 6''', 6" and 6', respectively. In FIG. 4A, part of the dark current-compensated signal (part of 6") exceeds the reference voltages VA and VB, and the signal level is too high. In this case, the outputs of both the comparators COMPA and COMPB are at high level. In FIG. 4B, the dark current-compensated signal is lower than the reference voltage VB and the signal level is too low. In this case, the outputs of both the comparators COMPA and COMPB are at low level. In FIG. 4C, the peak value of the dark current-compensated signal is between the reference voltages VA and VB is at a suitable level. In this case, only the output of the comparator COMPB is at high level, and the output of the comparator COMPA is at low level. If the reference voltages VA and VB are so selected to set the suitable level of the dark current-compensated signal, the combination of the high or low level of the outputs of the comparators COMPA and COMPB indicates the appropriateness of the dark current-compensated signal level. If VA>VB in this embodiment, when the outputs of both the comparators COMPA and COMPB are at high level, it indicates that the dark current-compensated signal is at too high a level including saturated level. When the outputs of both the comparators COMPA and COMPB are at low level, it indicates that the dark current-compensated signal level is too low. Only when the output of the comparator COMPA is at low level and the output of the comparator COMPB is at high level, does it indicate that the dark current-compensated signal is at a suitable level.

The outputs of the comparators COMPA and COMPB are supplied to a accumulating time control circuit AGC for maintaining the appropriate dark current-compensated signal level by shortening the accumulating time of the CCD 6 when it is too high and by prolonging the accumulating time when it is too low. In response to a synchronizing signal from the timing generator TMGE, the integrating time control circuit AGC operates so that it may be able to discriminate the state of the outputs of the comparators COMPA and COMPB at the timing at which the dark current-compensated signals are output from the light-receiving sections 6', 6" and 6'''. Based on the output state of the comparators COMPA and COMPB, the accumulating time control circuit AGC outputs a command signal to shorten or prolong the accumulating time to the timing generator TMGE. In response to the command signal, the timing generator TMGE so operates the clock driver CLKD that the accumulating time of the CCD 6 may be shortened or prolonged at the next output from the CCD 6.

The high-pass filter HPF evaluates the degree of change in the image. The high-pass filter extracts the high frequency components from the image signal as a first step in evaluating the sharpness of the image.

The buffer amplifier circuit SAC is connected to the high-pass filter HPF. A synchronizing signal is supplied to the buffer amplifier SAC from the timing generator TMGE, in synchronism with the timing at which the effective image signals corresponding to the light-receiving sections 6′, 6″ and 6‴ of the CCD 6 are input to the high-pass filter HPF. The buffer amplifier SAC is incorporated to prevent outputs of the high-pass filter HPF which are unrelated to the sharpness of the image and which are caused by the abrupt changes in the signals generated at the initiating point of the light-receiving operation. The buffer amplifier SAC therefore controls the operation of the high-pass filter HPF.

The output of the high-pass filter HPF is supplied to a squaring circuit SQR through an absolute value circuit ABS. The absolute value circuit ABS takes the absolute value of the output from the high-pass filter HPF. Since there may be both a positive and a negative change in the image signal (dark to bright and bright to dark), if the output of the high-pass filter HPF were directly supplied to an integrating circuit INT to be described later, the outputs may cancel each other and the signal representing the sharpness of the image might become zero depending upon the image pattern. The absolute value circuit ABS is incorporated to prevent this. The squaring circuit SQR may utilize, for example, nonlinear input/output characteristics of a semiconductor. The function of the squaring circuit SQR in this circuitry is to emphasize and evaluate the peak output of the high-pass filter HPF, that is, the state wherein the change of the image signal with time is great and the sharpness is high. The squaring circuit SQR incorporates a window function generating circuit WIN. This is to prevent, by lowering the weight for evaluation of the sharpness of the image near the edge of the field of view, the introduction of errors in the normal evaluation of the sharpness when an image outside the field of view enters inside the field of view as part of the out-of-focus image. This is also to prevent the introduction of transient error when another image enters the field of view due to blurring of the image formed by the imaging lens 1. The output of the window function generating circuit WIN controls the gain of the squaring circuit SQR so that it may become low at the edge of the field of view and become high at the center. Thus, in response to the timing signal from the timing generator TMGE synchronous with the initiation of operation of the light-receiving sections 6′, 6″ and 6‴ of the CCD 6, the window function generating circuit WIN controls the gain of the squaring circuit according to the relationship determined in correspondence with the location (location in the field of view).

The output of the squaring circuit SQR including the emphasized sharpness data is input to the integrating circuit INT which performs integration for the entire area of the light-receiving sections and outputs the sharpness of the image at each of the light-receiving sections. A synchronizing signal is also supplied from the timing generator TMGE to the integrating circuit INT so that integration and integration resetting may be performed at the timings corresponding to the light-receiving sections 6′, 6″ and 6‴. In this manner, the output of the integrating circuit INT corresponds to the electric output such as the sharpness of the respective images corresponding to the order of output from the light-receiving sections 6′, 6″ and 6‴ of the CCD 6.

The analog output of the integrating circuit INT is input to an A-D converting circuit A/D for conversion into a digital value so that the signal processing may be facilitated for discrimination at a central processing unit CPU of an in-focus state, a near-focus state, and a far-focus state of the imaging lens 1.

FIGS. 5A-5F show the output waveforms of the respective blocks of the circuitry in order to clarify the analog processing of the series of signals representing the sharpness of the image, starting from the read-out of the image signals from the light-receiving sections 6′, 6″ and 6‴ of the CCD 6 (the field of view for the three images) until the integration at the integrating circuit INT. In FIGS. 5A-5F, time is plotted as the abscissa and the voltage or current output is plotted as the ordinate in arbitrary units. The ranges indicated at arrows 6′, 6″ and 6‴ in FIG. 5 represent the timings with which the signals corresponding to the light-receiving sections 6′, 6″ and 6‴ of the CCD 6 are output and processed. The state of the respective images corresponds to the in-focus state of the imaging lens 1 in which the sharpness of the image of the light-receiving section 6″ is highest, that is, the sharpness as shown at 9 in FIG. 1C is highest. FIG. 5 shows the state of the signal output from the CCD 6 only once, but these signals are repeatedly output in practice.

Figure 5A:
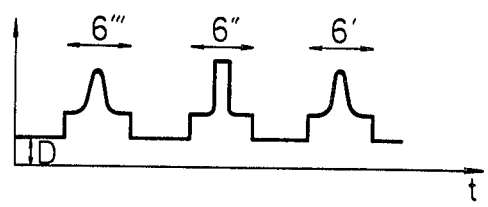
FIGS. 5A to 5F show output waveforms of the outputs of the main blocks of the circuitry shown in FIG. 2.
Figure 5B:
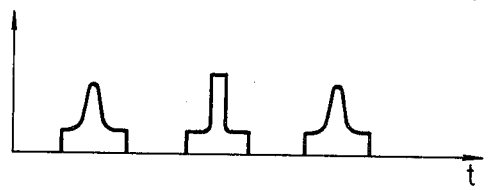
Figure 5C:
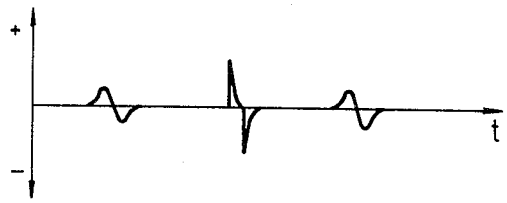
Figure 5D:
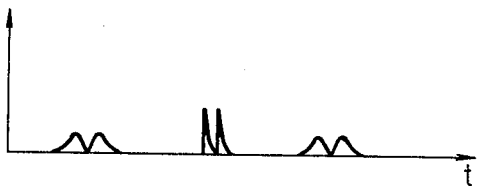
Figure 5E:
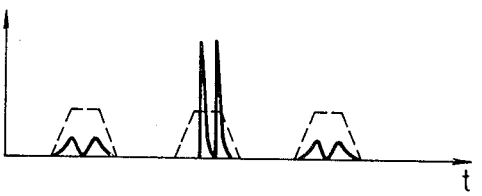
Figure 5F:
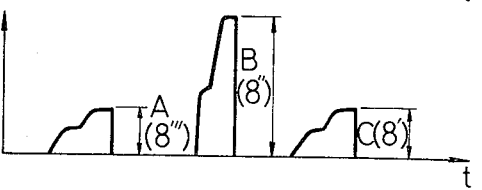

FIG. 5A shows the image signal which is output from the CCD 6 and has passed through the sampling and holding circuit SHA. The order for output of the images from the light-receiving sections is 6‴, 6″ and 6′. The voltage indicated by letter D is the dark current level, which is first output and is held by the sampling and holding circuit SHB. FIG. 5B shows the output of the differential amplifier DIF, that is, the dark current-compensated signal in which the dark current level D is cancelled. FIG. 5C shows the output of the high-pass filter HPF. FIG. 5D shows the output of the absolute value circuit ABS. FIG. 5E shows the output of the squaring circuit SQR, wherein the trapezoids indicated by the broken lines show the manner in which the gain of the squaring circuit SQR changes within the field of view according to the shape of the window generated by the window function generating circuit WIN described above. FIG. 5E shows the output of the integrating circuit INT wherein levels A(8‴), B(8″) and C(8′) correspond to the sharpnesses of the images on the light-receiving sections 6‴, 6″ and 6′, respectively. Specifically, A, B and C in FIG. 5F correspond to the levels of the curves 8‴, 8″ and 8′ of FIG. 1C at the point 9.

The levels A, B and C are converted into digital data by the A-D converting circuit A/D described above and are input to the central processing circuit CPU. The CPU computes the relationships among the levels A, B and C according to the conditions of the in-focus state, the near-focus state, the far-focus state, and the interruption of the discrimination which are set in advance. Basically, in the in-focus state, conditions B>A, B>C and A=C are satisfied. In the near-focus state, condition C>A is satisfied, and in the far-focus state, condition A>C is satisfied. The CPU discriminates which set of conditions is satisfied and outputs a signal corresponding to one of these three states. As the algorithm for the discrimination at the CPU may be adopted the algorithm as disclosed in U.S. patent application Ser. No. 151,533, "Focus Detecting System", Sakai et al, filed on May 19, 1980 (corresponding German Patent Application P 30 19 901.0) of the same assignee or in the U.S. patent application Ser. No. 310,373 filed on Oct. 16, 1981 by Shinji Sakai, Nobuhiko Shinoda, Takao Kinoshita, Kazuya Hosoe and Takashi Kawabata (corresponding Japanese Patent Application No. 144,782/1980).

The output of the central processing circuit CPU is input to the display circuit DISP. The display circuit DISP basically comprises a logic circuit and a drive circuit for driving indicators such as LEDs. In accordance with the commands from the central processing circuit CPU, in this embodiment, the display circuit DISP lights up the light-emitting diode LEDB in the case of in-focus state, and lights up the light-emitting diodes LEDC and LEDA, respectively, in the cases of near-focus and far-focus states, to indicate that the imaging lens 1 is in the in-focus, near-focus or far-focus state. A protective resistor R is incorporated to protect the LEDA to LEDC when a voltage V is supplied to them. Although LEDs are used in this embodiment, liquid crystal display devices, electrochromies or the like may be used.

Figure 10:
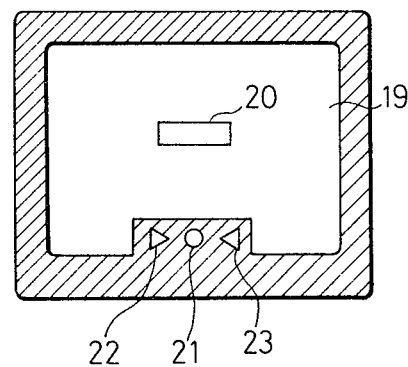
FIG. 10 is a view showing an example of a display when the focus detecting system is applied to a camera.

FIG. 10 shows a focus detection display suitable for focusing of the photographic lens of a camera, which involves a range finder field frame 19 of the camera, a field mark 20 representing the location of the field of view, and a mark 21 representing the in-focus state of the photographic lens. The light-emitting diode LEDB shown in FIG. 2 is arranged immediately behind the mark 21. Arrow marks 22 and 23 (arrows represent the direction of rotation of a distance dial of the photographic lens for relocating it from the out-of-focus position to the in-focus position) represent the near-focus state and the far-focus state, respectively. The light-emitting diodes LEDC and LEDA shown in FIG. 2 are arranged immediately behind the arrow marks 22 and 23, respectively. In this manner, the operator is capable of confirming the focusing state of the photographic lens simply by observing which one of these marks is lit. If the mark 21 representing the in-focus state is lit, the focusing operation is interrupted. If the arrow mark 22 or 23 is lit, the distance dial need only be rotated in the direction indicated by the arrow mark 22 or 23, respectively, until the in-focus mark 21 is lit.

The configuration of the timing generator TMGE will be described with reference to FIGS. 6 and 7.

Figure 6:
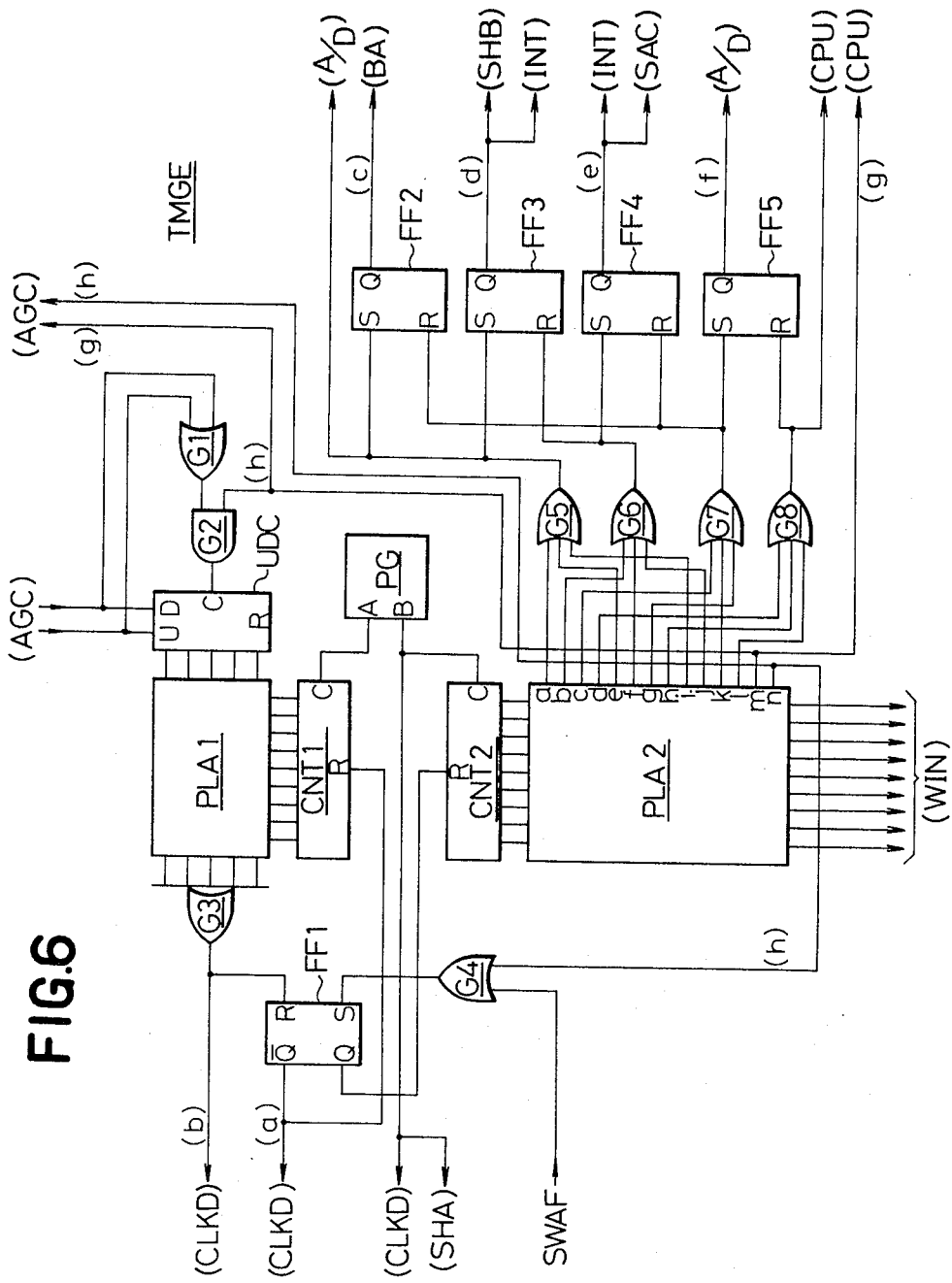
FIG. 6 is a block diagram showing the configuration of a timing generator in the circuitry shown in FIG. 2.
Figure 7:
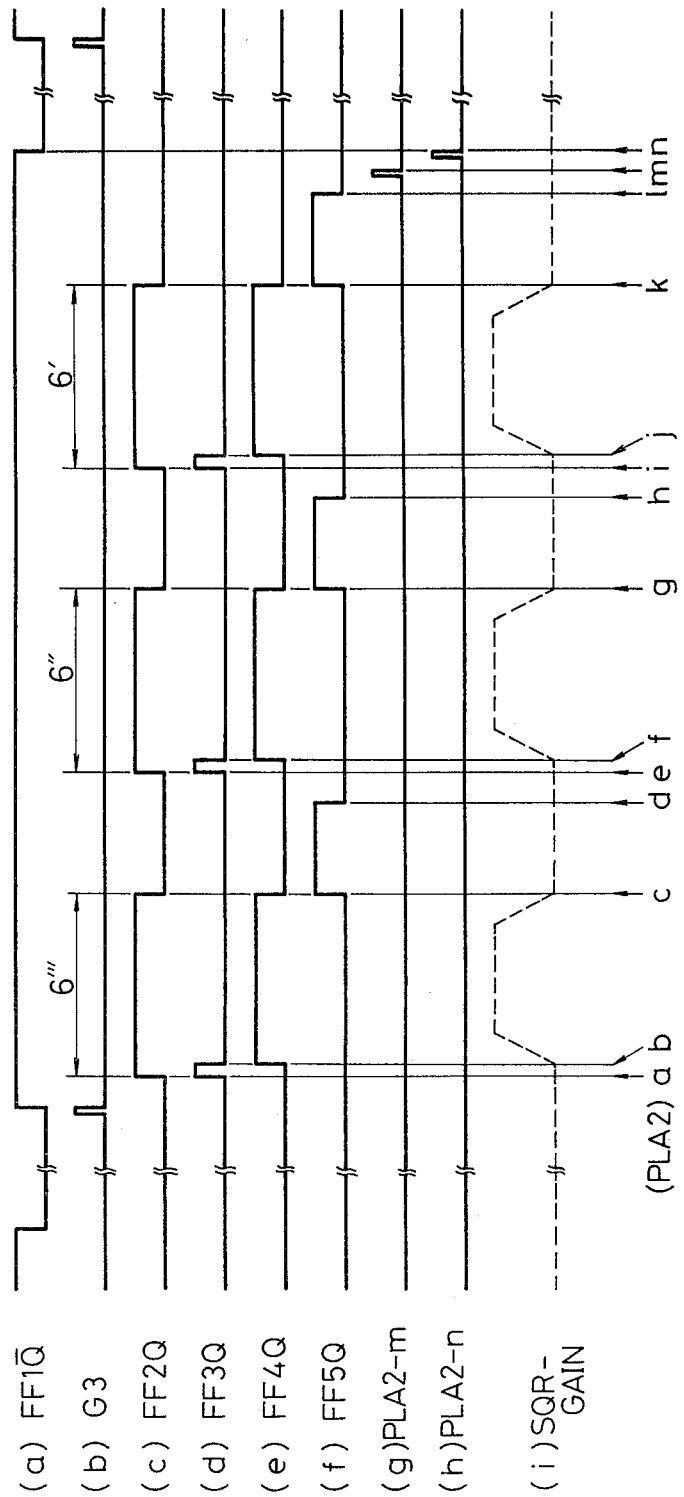
FIG. 7 is a timing chart showing timing signals for controlling various operations which are output from the timing generator shown in FIG. 6.

Referring to FIG. 6, the part of the circuitry consisting of an up/down counter UDC, a counter CNT1, a programmable logic array PLA1, OR gates G1 and G3, and AND gate G2 mainly serves to regulate the accumulating time of the CCD 6. The up/down counter UDC is set in the up-counting mode in response to an accumulating time shortening command from the accumulating time control circuit AGC and is set in the down-counting mode in response to an accumulating time prolonging command therefrom. The up/down counter UDC is so controlled to count one pulse at a predetermined timing to be described later to set a different accumulating time only if an accumulating time change command is output from the accumulating time control circuit AGC. The CNT1 counts a pulse train A from a pulse generator PG. When the count of the counter CNT1 reaches a predetermined value which is set by the output of the up/down counter UDC, the programmable logic array PLA1 generates a timing pulse which is output through the OR gate G3. The output of the OR gate G3 is supplied to the clock drive CLKD, in response to which the clock driver CLKD generates a start pulse (shift pulse) for initiating the output of the signals from the CCD 6. The start pulse is supplied to the CCD 6. The output waveform of the OR gate G3 is as shown in FIG. 7(b).

An RS flip-flop FF1 generates a control signal to the clock drive CLKD to normally set the CCD 6 in the clear condition and to release the clear condition only during the period in which signal integration is required. The RS flip-flop FF1 is set by the operation command signal SWAF described above which is supplied through an OR gate G4 or a pulse signal for repetition of the operation which is generated at a predetermined timing to be described later. The RS flip-flop FF1 is reset by the output of the OR gate G3. The $\overline{Q}$ output of the RS flip-flop FF1 as shown in FIG. 7(a) is supplied as a control signal to the clock drive CLKD. The CCD 6 has an overflow drain gate which is opened or closed according to the $\overline{Q}$ output of the RS flip-flop FF1 (the gate is opened when the $\overline{Q}$ output is at high level and is closed when it is at low level) to thereby control the integration of the signal charge by the CCD 6. The interval shown in FIG. 7(a) in which the $\overline{Q}$ output of the RS flip-flop FF1 is at low level corresponds to the accumulating time of the signal charge, which is defined as an interval from the predetermined timing of setting the RS flip-flop FF1 to the generation of the pulse from the OR gate G3. Since the timing at which the pulse is generated from the OR gate G3 is regulated by the output from the up/down counter UDC, the accumulating time of the signal charge of the CCD 6 is regulated by the output of the up/down counter UDC. The $\overline{Q}$ output of the RS flip-flop FF1 is supplied to the counter CNT1 as a reset signal. Therefore, the counter CNT1 performs counting only during the interval in which the $\overline{Q}$ output of the flip-flop FF1 is at low level and is kept reset in other conditions.

The circuitry part consisting of a counter CNT2, a programmable logic array PLA2, OR gates G5 to G8, and RS flip-flops FF2 to FF5 mainly serves to control the respective parts and the overall sequence of the circuit shown in FIG. 2. The counter CNT2 counts a pulse train B from the pulse generator PG. In this embodiment, the CCD 6 is of single-phase driven type. The pulse train B is also supplied to the clock driver CLKD which generates from the pulse train B a driver clock pulse (transfer clock pulse) to be supplied to the CCD 6. The count of the counter CNT2 and the drive (transfer of the charge) are in one-to-one correspondence. The pulse train B is also supplied to the sampling and holding circuit SHA as the sampling pulse. The content of the programmable logic array PLA2 is so programmed that, based on the count output from the counter CNT2, pulses are generated from terminals a to n at the respective timings shown in FIGS. 7(a) to 7(n) after the pulse is generated from the OR gate G3. In response to the outputs from the terminals a, e and i of the programmable logic array PLA2, the OR gate G5 produces an output which is supplied to the set terminals of the RS flip-flops FF2 and FF3. In response to the outputs from the terminals b, f and j of the programmable logic array PLA2, the OR gate G6 produces an output which is supplied to the reset terminal of the RS flip-flop FF3 and the set terminal of the RS flip-flop FF4. In response to the outputs from the terminals c, g and k of the programmable logic array PLA2, the OR gate G7 produces an output which is supplied to the reset terminals of the RS flip-flops FF2 and FF4 and to the set terminal of the RS flip-flop FF5. In response to the outputs from the terminals d, h and l of the programmable logic array PLA2, the OR gate G8 produces an output which is supplied to the reset terminal of the RS flip-flop FF5. The Q outputs of the RS flip-flops FF2 to FF5 are shown in FIGS. 7(c) to 7(f) as contrasted with the timings (shown in FIG. 7(b)) at which the signals are output from the respective light-receiving sections 6''', 6'' and 6' of the CCD 6. The Q output (FIG. 7(c)) of the RS flip-flop FF2 is supplied to the balance adjusting circuit BA. The high level interval of the Q output (FIG. 7(d)) of the RS flip-flop FF3 corresponds to the dark current bit at the end of each of the outputs of the light-receiving sections 6''', 6'' and 6', and is supplied to the sampling and holding circuit SHB as a sampling pulse. The Q output of the RS flip-flop FF3 is also supplied to the integrating circuit INT as a reset signal. The high level interval of the Q output (FIG. 7(e)) of the RS flip-flop FF4 corresponds to the effective image signal bit of the outputs of each of the light-receiving sections 6''', 6'' and 6', and is supplied to the buffer amplifier SAC as a control signal as well as to the integrating circuit INT as an integration command signal. The Q output (FIG. 7(f)) of the RS flip-flop FF5 is supplied to the A-D converting circuit A/D as an A-D conversion command. The output of the OR gate G5 is supplied to the A-D converting circuit A-D as a reset signal. The output of the OR gate G8 is supplied to the central processing circuit CPU as a strobe pulse for storing the output from the A-D converting circuit A/D. The output (FIG. 7(g)) from the terminal m of the programmable logic array PLA2 is supplied to the AND gate G2 as a count pulse of the up/down counter UDC as well as to the accumulating time control circuit AGC and the central processing unit CPU as a latch pulse for latching the outputs thereof. The output (FIG. 7(h)) from the terminal n of the programmable logic array PLA2 is supplied to the OR gate G4 as a set signal of the RS flip-flop FF1 as well as to the accumulating time control circuit AGC as a reset signal for the flip-flop therein. The Q output of flip-flop FF1 (the inverted signal of the $\overline{Q}$ output shown in FIG. 7(a)) is supplied to the counter CNT2 as a reset signal. If the counter CNT1 is in the count-enabling mode, the counter CNT2 is placed under the reset condition. If the counter CNT1 is under the reset condition, the counter CNT2 is set in the count-enabling mode. The count of the counter CNT2 is output to the window function generating circuit WIN. In response to the count output from the counter CNT2, the window function generating circuit WIN performs gain control so that the gain of the squaring circuit SQR changes as shown in FIG. 7(i). The window function generating circuit WIN may be of the configuration as disclosed in U.S. patent application Ser. No. 151,703, filed on May 20, 1980 by Kawabata et al (corresponding German Patent Application No. P 30 19 908.7) of the assignee of the present invention.

Figure 8:
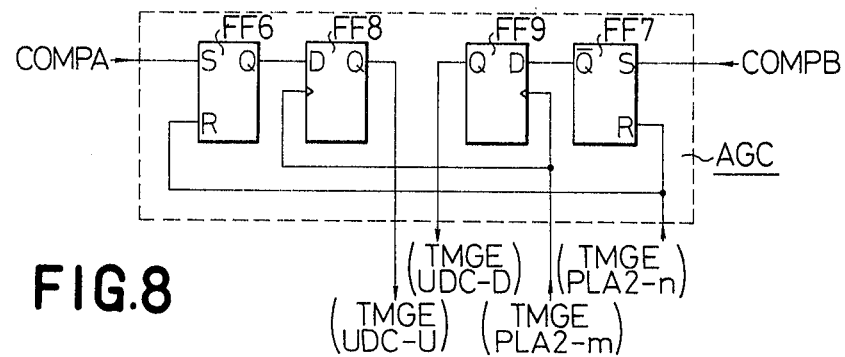
FIG. 8 is a block diagram showing the configuration of the accumulating time control circuit in the circuitry shown in FIG. 2.

Describing next the configuration of the accumulating time control circuit AGC, referring to FIG. 8, an RS flip-flop FF6 is set by an output of high level of the comparator COMPA, and an RS flip-flop FF7 is set by an output of high level of the comparator COMPB. Both of these RS flip-flops FF6 and FF7 are reset by an output (FIG. 7(h)) of high level from the terminal n of the programmable logic array PLA2 in the timing generator TMGE shown in FIG. 6. In response to an output (FIG. 7(g)) of high level from the terminal m of the programmable logic array PLA2 in the timing generator TMGE, a D flip-flop FF8 latches the Q output of the RS flip-flop FF6, and a D flip-flop FF9 latches the Q output of the RS flip-flop FF7. A high level of the Q output from the D flip-flop FF8 represents the shortening of the accumulating time, and a high level of the Q output of the D flip-flop FF9 represents the prolongation of the accumulating time. These outputs are supplied to count mode setting terminals U and D of the up/down counter UDC in the timing generator TMGE shown in FIG. 6.

The configuration of the buffer amplifier circuit SAC described above will now be described with reference to FIG. 9.

Figure 9:
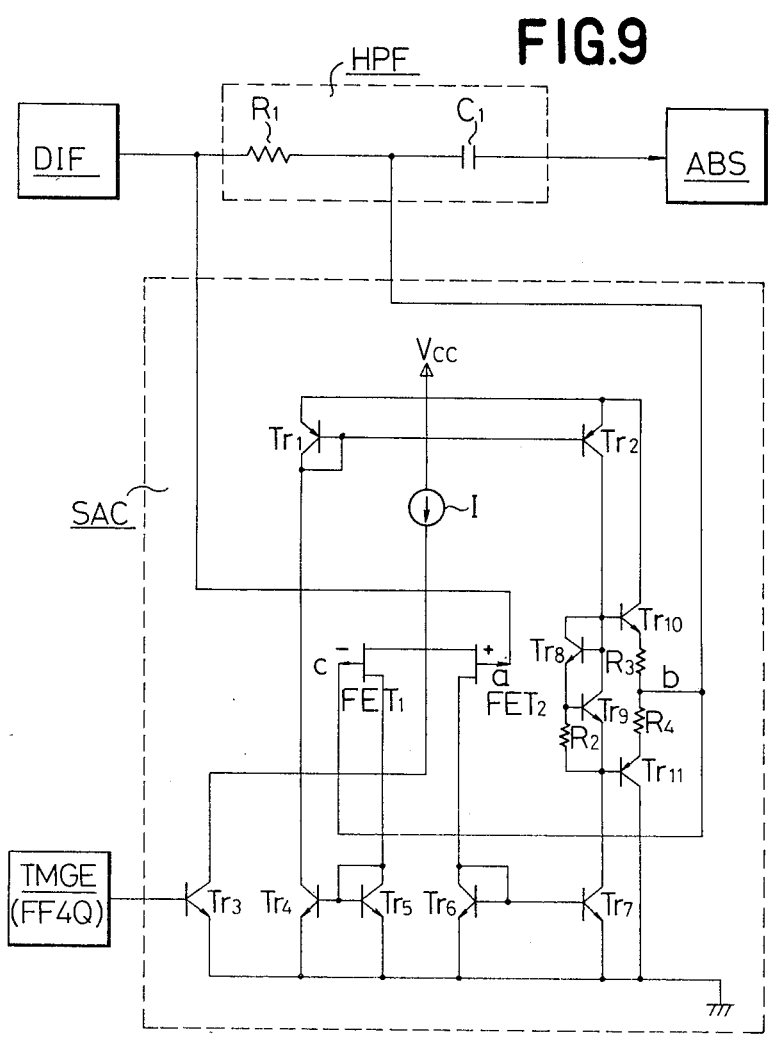
FIG. 9 is a partial circuit diagram showing an example of the buffer amplifier circuit for the high-pass filter circuit shown in FIG. 2.

The buffer amplifier SAC shown in FIG. 9 is an example which is suitable to preset the high-pass filter HPF and to suppress erroneous signals obtained at the effective initial moment of light reception by the CCD 6 or immediately thereafter. The most outstanding features of the buffer amplifier SAC are: the response speed is significantly faster; the configuration is simpler as compared with FET switches or the like; and load applied to the differential amplifier DIF upon presetting of the high-pass filter HPF is significantly less. Referring to FIG. 9, a resistor R1 and a capacitor C1 are connected in series to the output end of the differential amplifier DIF described above and constitute the high-pass filter HPF. The capacitor C1 is connected to the absolute value circuit ABS. The ends of the resistor R1 are connected to a non-inverting input terminal a and an output terminal b of the buffer amplifier SAC. An inverting input terminal c of the buffer amplifier SAC is connected to the output terminal b, thereby constituting the buffer amplifier. Field effect transistors FET1 and FET2 comprise the differential amplifier at the input stage, and current flows from a constant current source I to the sources of these transistors. Transistors Tr5 and Tr6 serve as a load of the differential amplifier and form a current mirror circuit together with transistors Tr4 and Tr7. Transistors Tr1 and Tr2 also form a current mirror circuit. Transistors Tr8 and Tr9 and a resistor R2 constitute a bias circuit to set the bias of transistors Tr10 and Tr11 at the output stage. In response to the timing signal (FIG. 7(e)) from the Q output of the flip-flop FF4 in the timing generator TMGE in FIG. 6 synchronous with the timing of the light reception, a transistor Tr3 is turned on. The collector of the transistor Tr3 is connected to the sources of the field effect transistors FET1 and FET2. When the timing signal as described above is generated, the transistor Tr3 is turned on and the sources of the field effect transistors FET1 and FET2 are grounded. Therefore, the output impedance of the buffer amplifier SAC becomes high, allowing normal operation of the high-pass filter. However, when the timing signal goes low level at the initial moment of effective light reception by the CCD 6 or immediately thereafter, the transistor Tr3 is turned off and the output impedance of the buffer amplifier SAC becomes low. When the output of the differential amplifier rises in response to the turning off of the transistor Tr3, the field effect transistor FET2 is turned off and the field effect transistor FET1 is turned on. Therefore, the transistors Tr5, Tr4, Tr1, Tr2 and Tr10 are turned on. Current then flows to the capacitor C1 from power source Vcc to precharge the capacitor C1. This places the high-pass filter HPF under the preset condition. When the signal output from the timing generator TMGE goes high level, the output impedance of the buffer amplifier SAC becomes high. Then, the high-pass filter HPF operates, so that erroneous outputs from the light-receiving section of the CCD 6 at the initial moment of light reception may be completely eliminated. Thereafter, the change with time of the output from the differential amplifier DIF is detected on the basis of the level to which the capacitor C1 has been precharged.

In summary, in accordance with the present invention, by connecting a circuit of simple configuration to the high-pass filter, the adverse effects of the abrupt high outputs from the photoelectric transducer element may be suppressed without delay.

What is claimed is:

1. A focus detecting system for detecting a focusing state of an imaging optical system on an object, comprising:
   (A) image scanning means for scanning an object image formed by said imaging optical system to generate a time-serial scanning signal representing a radiation distribution of the image;
   (B) processing means for processing the time-serial scanning signal from said image scanning means to generate an output signal representing an image formation state of the image, said processing means including a change detecting circuit for detecting a change with time of the time-serial scanning signal, said change detecting circuit having a high-pass filter circuit;
   (C) an amplifying circuit for initial-setting said change detecting circuit, and having input and output ends connected to said change detecting circuit in said processing means, an output impedance of said amplifying circuit being controlled externally; and
   (D) impedance controlling means for controlling the output impedance of said amplifying circuit in association with a timing at which the time-serial scanning signal is output from said image scanning means, wherein said impedance controllling means changes the output impedance of said amplifying circuit from low to high substantially in synchronism with a timing at which an effective image scanning signal, the change with time of which is to be detected by said change detecting circuit, is generated from said image scanning means.

2. A system according to claim 1, wherein said high-pass filter has a series connection of a resistor and a capacitor, the input and output ends of said amplifying circuit being respectively connected to ends of said resistor.

3. A focus detecting system for detecting a focusing state of an imaging optical system on an object, comprising:
   (A) image scanning means for scanning an object image formed by said imaging optical system to generate a time-serial scanning signal representing a radiation distribution of the image, and to generate an effective image scanning signal, after a predetermined time period from start of scanning;
   (B) processing means for processing the time-serial scanning signal from said image scanning means to generate an output signal representing an image formation state of the image, said processing means including a change detecting circuit for detecting a change with time of the time-serial scanning signal;
   (C) control means connected to said change detecting circuit for disabling said change detecting circuit until the generation of said effective image scanning signal.

4. A focus detecting system according to claim 3, wherein said control means includes:
   (d) first means having first and second output states, said first means disabling the change detecting circuit when in the first output state, and enabling the change detecting circuit when in the second output state; and
   (e) second means for applying an input signal to said first means in association with timing of the generation of the time-serial scanning signal in said image scanning means, the output state of said first means being changed from the first output state to the second output state in response to the input signal.

5. A focus detecting system according to claim 3, wherein said control means includes:
   (d) amplifying means having first and second output states, said amplifying means disabling the change detecting circuit when said amplifying means is in the first output state, and enabling the change detecting circuit when said amplifying means is in the second output state; and
   (e) impedance control means for appplying an input signal to said amplifying means in associated with timing of the generation of the time-serial scanning signal in said image scanning means, the output state of said amplifying means being changed from the first output state to the second output state in response to the input signal.

6. A focus detecting system according to claim 5, wherein said amplifying means is connected to an input terminal of the change detecting circuit, said first output state is a low impedance state and said second output state is a high impedance state.

7. A focus detecting system according to claim 5, wherein the output state of said amplifying means is changed from a low impedance state to a high impedance state in response to the input signal from said impedance control means.

* * * * *